(12) United States Patent
Takvorian

(10) Patent No.: US 12,355,644 B2
(45) Date of Patent: Jul. 8, 2025

(54) INCORPORATION OF A TRACE VISUALIZATION WITH A TRAFFIC GRAPH VISUALIZATION IN A SERVICE MESH

(71) Applicant: Red Hat, Inc., Raleigh, NC (US)

(72) Inventor: Joel Takvorian, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/739,571

(22) Filed: May 9, 2022

(65) Prior Publication Data
US 2022/0272009 A1 Aug. 25, 2022

Related U.S. Application Data

(63) Continuation of application No. 16/933,111, filed on Jul. 20, 2020, now Pat. No. 11,329,903.

(51) Int. Cl.
*H04L 43/062* (2022.01)
*G06F 11/32* (2006.01)
*H04L 41/22* (2022.01)
*H04L 43/0805* (2022.01)
*H04L 67/56* (2022.01)

(52) U.S. Cl.
CPC .......... *H04L 43/062* (2013.01); *G06F 11/323* (2013.01); *H04L 41/22* (2013.01); *H04L 43/0805* (2013.01); *H04L 67/56* (2022.05)

(58) Field of Classification Search
CPC ... H04L 43/062; H04L 41/22; H04L 43/0805; H04L 67/56; H04L 41/5009; H04L 67/51; G06F 11/323
See application file for complete search history.

(56) References Cited

U.S. PATENT DOCUMENTS

| | | |
|---|---|---|
| 8,312,138 B2 | 11/2012 | Hull et al. |
| 8,443,074 B2 | 5/2013 | Bahl et al. |
| 8,819,561 B2 | 8/2014 | Gupta et al. |
| 9,135,145 B2 | 9/2015 | Voccio et al. |
| 9,577,900 B1 | 2/2017 | Nataraj et al. |

(Continued)

OTHER PUBLICATIONS

B. Yu and C. T. Silva, "VisFlow—Web-based Visualization Framework for Tabular Data with a Subset Flow Model," in IEEE Transactions on Visualization and Computer Graphics, vol. 23, No. 1, pp. 251-260, Jan. 2017, doi: 10.1109/TVCG.2016.2598497. (Year: 2017).*

(Continued)

*Primary Examiner* — Patrice L Winder
(74) *Attorney, Agent, or Firm* — Dority & Manning, P.A.

(57) ABSTRACT

Incorporation of a trace visualization with a traffic graph visualization in a service mesh is disclosed. Traffic graph information that identifies a plurality of nodes and a plurality of edges is accessed. Each node corresponds to a particular service of a plurality of interrelated services, each service being configured to receive and/or send a message to at least one other service, each edge representing a path that at least one message has taken between two services. First trace information that identifies a first set of services that were invoked during a same first transaction is accessed. Each service in the first set of services is correlated with a corresponding node of the plurality of nodes. A traffic graph visualization and a first transaction trace visualization are presented concurrently on a display device.

19 Claims, 12 Drawing Sheets

(56) References Cited

U.S. PATENT DOCUMENTS

| | | | |
|---|---|---|---|
| 9,772,927 | B2 | 9/2017 | Gounares et al. |
| 10,397,343 | B1 | 8/2019 | Goldberg et al. |
| 10,489,375 | B1 | 11/2019 | McClintock et al. |
| 10,581,886 | B1 | 3/2020 | Sharifi Mehr |
| 10,680,918 | B1 | 6/2020 | Mazzitelli et al. |
| 10,698,756 | B1 | 6/2020 | Abdelsalam et al. |
| 10,924,410 | B1 | 2/2021 | Nee et al. |
| 11,347,625 | B1* | 5/2022 | Agarwal ............ G06F 11/3006 |
| 2014/0052857 | A1* | 2/2014 | Bansal ................... H04L 43/04 709/224 |
| 2016/0373535 | A1* | 12/2016 | El Defrawy ............ H04L 67/51 |
| 2017/0075799 | A1* | 3/2017 | Lau ......................... H04L 67/10 |
| 2018/0123919 | A1 | 3/2018 | Naous et al. |
| 2019/0347589 | A1 | 11/2019 | Sullivan et al. |
| 2020/0044940 | A1 | 2/2020 | Thomasson et al. |
| 2020/0364035 | A1* | 11/2020 | White .................. G06F 9/5038 |
| 2020/0366759 | A1 | 11/2020 | Sinha |
| 2021/0028991 | A1* | 1/2021 | Nataraj ............... H04L 41/5009 |
| 2021/0136141 | A1* | 5/2021 | Tidemann ........... H04L 47/2483 |
| 2021/0232485 | A1* | 7/2021 | Agarwal .............. G06F 11/364 |
| 2022/0021592 | A1 | 1/2022 | Takvorian |

OTHER PUBLICATIONS

W. De Pauw, M. Lei, E. Pring, L. Villard, M. Arnold and J. F. Morar, "Web Services Navigator: Visualizing the execution of Web Services," in IBM Systems Journal, vol. 44, No. 4, pp. 821-845, 2005, doi: 10.1147/sj.444.0821. (Year: 2005).*

S. Agarwala, F. Alegre, K. Schwan and J. Mehalingham, "E2EProf: Automated End-to-End Performance Management for Enterprise Systems," 37th Annual IEEE/IFIP International Conference on Dependable Systems and Networks (DSN'07), Edinburgh, UK, 2007, pp. 749-758, doi: 10.1109/DSN.2007.38. (Year: 2007).*

Author Unknown, "kiali—Features," https://kiali.io/documentation/latest/features/, Downloaded May 28, 2020, 10 pages.

Dobrev, P. et al., "Visualization of Node Interaction Dynamics in Network Traces," Scalability of Networks and Services, Proceedings of the Third International Conference on Autonomous Infrastructure, Management and Security, AIMS 2009 Enschede, The Netherlands, Jun./Jul. 2009, IFIP International Federation for Information Processing, pp. 147-160.

Mansmann, F. et al., "Interactive Exploration of Data Traffic with Hierarchical Network Maps," IEEE Transaction on Visualization and Computer Graphics, vol. 12, No. 6, Oct.-Dec. 2006, 12 pages.

Sambasivan, R. et al., "Principled workflow-centric tracing of distributed systems," SoCC '16: Proceedings of the Seventh ACM Symposium on Cloud Computing, Oct. 5-7, 2016, Sana Clara, CA, ACM, pp. 401-414.

Shi, Ronghua, et al., "A Matrix-Based Visualization System for Network Traffic Forensics," IEEE Systems Journal, vol. 10, Issue 4, pp. 1350-1360, Dec. 2016, 11 pages.

Takvorian, Joel, "Tracing in Kiali, correlation with Metrics," https://medium.com/kialiproject/tracing-in-kiali-correlation-with-metrics-6e7c1cc67e2a, Feb. 25, 2020, 3 pages.

Zhang et al., "HintVis: The Hierarchical Visualization of Network Traffic Data," 2013 International Conference on Virtual Reality and Visualization, Sep. 14-15, 2013, IEEE, 8 pages.

Non-Final Office Action for U.S. Appl. No. 16/933,111, mailed Jun. 24, 2021, 20 pages.

Notice of Allowance for U.S. Appl. No. 16/933,111, mailed Jan. 12, 2022, 18 pages.

* cited by examiner

INCORPORATION OF A TRACE VISUALIZATION WITH A TRAFFIC GRAPH VISUALIZATION IN A SERVICE MESH

RELATED CASE

This is a continuation of co-pending U.S. patent application Ser. No. 16/933,111, filed on Jul. 20, 2020, entitled "INCORPORATION OF A TRACE VISUALIZATION WITH A TRAFFIC GRAPH VISUALIZATION IN A SERVICE MESH," the disclosure of which is hereby incorporated herein by reference in its entirety.

BACKGROUND

There are benefits to dividing complex computing processing systems into separate, interrelated components. Separate components can increase scalability, compartmentalize related functionality, and reduce the likelihood that a problem in one component will impact other components.

SUMMARY

The examples disclosed herein incorporate a trace visualization with a traffic graph visualization in a service mesh. The examples, among other features, provide a concurrent and intuitive macro view of the overall traffic in a service mesh, and a micro view of a specific transaction in the service mesh. The examples therefore allow individuals to rapidly understand how a service mesh is processing traffic generally, as well as how a specific transaction is processed.

In one implementation a method is provided. The method includes accessing, by at least one processor device, traffic graph information that identifies a plurality of nodes and a plurality of edges, each node corresponding to a particular service of a plurality of interrelated services, each service being configured to receive and/or send a message to at least one other service in the plurality of interrelated services, each edge representing a path that at least one message has taken between two services. The method further includes accessing first trace information that identifies a first set of services of the plurality of interrelated services that were invoked during a same first transaction. The method further includes correlating each service in the first set of services with a corresponding node of the plurality of nodes. The method further includes presenting, concurrently, on a display device, a traffic graph visualization and a first transaction trace visualization, the traffic graph visualization depicting the plurality of edges and the plurality of nodes, the first transaction trace visualization identifying the nodes that correspond to the services in the first set of services.

In one implementation a computing device is provided. The computing device includes a memory and at least one processor device coupled to the memory. The processor device is to access traffic graph information that identifies a plurality of nodes and a plurality of edges, each node corresponding to a particular service of a plurality of interrelated services, each service being configured to receive and/or send a message to at least one other service in the plurality of interrelated services, each edge representing a path that at least one message has taken between two services. The processor device is further to access first trace information that identifies a first set of services of the plurality of interrelated services that were invoked during a same first transaction. The processor device is further to correlate each service in the first set of services with a corresponding node of the plurality of nodes, and present, concurrently, on a display device, a traffic graph visualization and a first transaction trace visualization, the traffic graph visualization depicting the plurality of edges and the plurality of nodes, the first transaction trace visualization identifying the nodes that correspond to the services in the first set of services.

In another implementation a non-transitory computer-readable storage medium is provided. The non-transitory computer-readable storage medium includes executable instructions to, upon execution by a processor device, access traffic graph information that identifies a plurality of nodes and a plurality of edges, each node corresponding to a particular service of a plurality of interrelated services, each service being configured to receive and/or send a message to at least one other service in the plurality of interrelated services, each edge representing a path that at least one message has taken between two services. The instructions further cause the processor device to access first trace information that identifies a first set of services of the plurality of interrelated services that were invoked during a same first transaction. The instructions further cause the processor device to correlate each service in the first set of services with a corresponding node of the plurality of nodes. The instructions further cause the processor device to present, concurrently, on a display device, a traffic graph visualization and a first transaction trace visualization, the traffic graph visualization depicting the plurality of edges and the plurality of nodes, the first transaction trace visualization identifying the nodes that correspond to the services in the first set of services.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
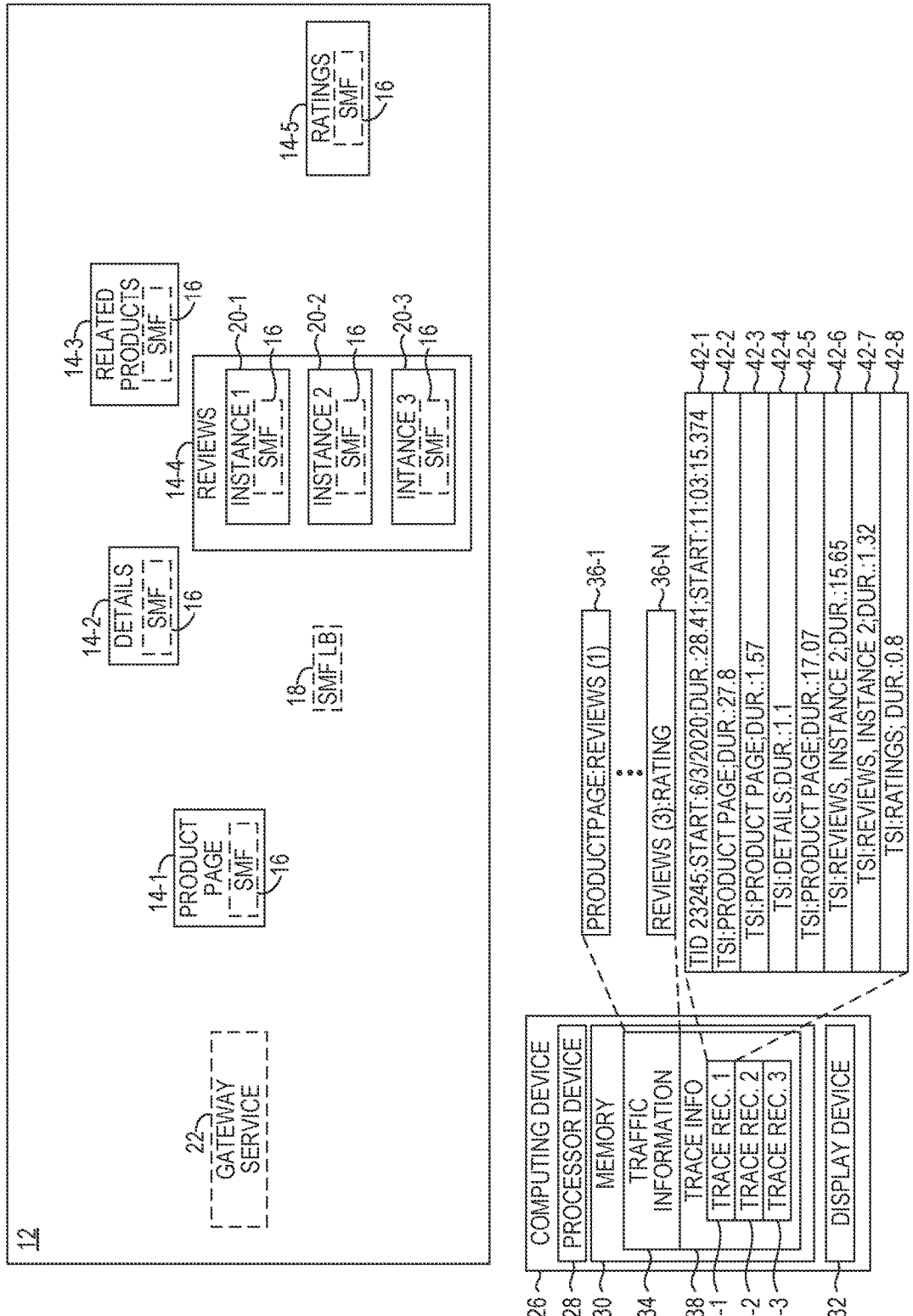
FIG. 1 is a block diagram of an environment in which examples of the incorporation of a trace visualization with a traffic graph visualization in a service mesh may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

There are benefits to dividing complex computing processing systems into separate, interrelated components. Separate components can increase scalability, compartmentalize related functionality, and reduce the likelihood that a problem in one component will impact other components. Such systems are sometimes referred to as a microservices architecture, and/or a service mesh, where individual services interact with one another to implement a business or other desired function.

Tools exist that provide insight into data processing statistics of interrelated services. Such tools may be able to provide, for example, a traffic graph that shows traffic, in the form of messages, which flow between services, and various information about such traffic, such as the volume of messages, and the like. Such tools can be useful, at a macro level, to understand overall load on certain services, and may be helpful, for example, to know whether or not to initiate multiple instances of a same service.

Such tools, however, are unaware of how or whether messages between different services relate to one another. For example, a web page generation system that builds a web page in response to a user request may involve a plurality of different services, each of which plays a role in building a particular portion of the web page. The generation of a single web page may involve tens of messages that are communicated between the services, and the web page generation may be building hundreds or thousands of pages substantially concurrently. Traffic tools are not able to determine which messages between services relate to the generation of the same web page.

Tracing tools exist that allow a service developer to generate information, sometimes referred to as trace information, while a service is processing a message or otherwise implementing a desired function. The information can comprise, for example, the duration of the processing of the service for the particular message, a start time and end time, attributes and characteristics about the particular message being processed, the values of variables at that point in time, and basically any other data available to the service at that instant in time.

The trace information is generally written to some data structure for subsequent analysis. The trace information is a micro level view into a specific transaction, and does not provide an intuitive understanding of how that transaction relates to the overall services of the web page generation system.

The examples disclosed herein incorporate a trace visualization with a traffic graph visualization in a service mesh.

The examples, among other features, provide a concurrent and intuitive macro view of the overall traffic in a service mesh, and a micro view of a specific transaction in the service mesh. The examples therefore allow individuals to rapidly understand how a service mesh is processing traffic generally, as well as how a specific transaction is processed.

FIG. 1 is a block diagram of an environment 10 in which examples of the incorporation of a trace visualization with a traffic graph visualization in a service mesh may be practiced. The environment 10 includes a service mesh 12 that comprises a plurality of interrelated services 14-1-14-5 (generally, services 14). The term "interrelated services" refers to a group of services that are part of the same service mesh. In some implementations, such as that illustrated in FIG. 1, the service mesh 12 is implemented via a service mesh infrastructure that may be used to provide certain infrastructure services to any service mesh, irrespective of the function of the service mesh. One such service mesh infrastructure is Istio (www.istio.io), although the examples disclosed herein are not limited to any particular service mesh architecture. The service mesh infrastructure includes components, referred to herein as service mesh functions (SMF) that implement standardized network communications among each of the services 14-1-14-5. Thus, each of services 14-1-14-5 includes an SMF 16 that handles network communications for the respective service 14-1-14-5. In Istio, the SMF 16 may be referred to as a "sidecar," which is implemented via an Envoy proxy (www.envoyproxy.io). Each of the services 14-1-14-5 has an identifier, in this example, "productpage," "details," "relatedproducts," "reviews" and "ratings," respectively. Each service 14 receives messages from other services 14 via the corresponding proxy (e.g., SMF 16), and each service 14 sends messages to the other services 14 via the corresponding proxy (e.g., SMF 16). The services 14 may sometimes be referred to herein with the corresponding identifier, such as "the productpage service 14-1" for purposes of discussion.

In some implementations, the services 14-1-14-5 may be containers, and the service mesh infrastructure may automatically inject the SMF 16 into each of the services 14-1-14-5. In some implementations, each of the services 14-1-14-5 may be implemented as a Kubernetes pod (kubernetes.io), and the service mesh infrastructure may automatically inject the SMF 16 into the Kubernetes pod as a separate container.

The service mesh infrastructure may include other components that facilitate communications in the service mesh 12, and may include other functions such as telemetry (e.g., the collection of traffic statistics), policy control, load balancing, and the like. In FIG. 1, a service mesh infrastructure loadbalancer ("SMF LB") 18 is illustrated. The SMF LB 18 receives messages from the service 14-1 that are directed to the service 14-4, and load balances the messages among three instances 20-1-20-3 of the service 14-4. In some implementations, the service mesh infrastructure may include a gateway service 22 that operates as an ingress and egress node, or service, for the service mesh 12. In such implementations, and in other implementations, the services 14-1-14-5 may not be exposed to any services outside of the service mesh 12, and may not be invokable or otherwise capable of being invoked by any service other than another service 14-1-14-5.

Although not illustrated, the services 14-1-14-5 execute on computing devices that include a processor device and a memory. The services 14-1-14-5 may execute on separate computing devices, or some or all of the services may execute on a same computing device. In some implementations, the service mesh 12 is implemented in a cloud computing environment.

Interrelated services may not be exposed to any services outside of the service mesh 12. Thus, each service can only be passed a message from another service within the service mesh 12. It is noted that the passing of messages among services may be by any desired message-passing mechanism, including, by way of non-limiting example, the transmission of one or more packets from one service 14 to another service 14, the transfer of information from one service 14 to another service 14 via variables, or any other inter-process communication mechanisms that facilitate the communication of information from one process to another process.

The environment 10 also includes a computing device 26, which includes a processor device 28, a memory 30, and a display device 32. As the service mesh 12 executes to generate web pages, statistics associated with the message traffic in the service mesh 12 are captured and maintained. In some examples, the statistics may be generated by the underlying service mesh architecture, such as, by way of non-limiting example, the Istio service mesh architecture. The statistics are captured and stored as traffic information 34. The traffic information 34 may include a plurality of entries 36-1-36-N (generally, entries 36), each of which identify a particular sending service 14 and particular receiving service 14 for a respective message communicated in the service mesh 12. In this example, the entry 36-1 indicates a message was communicated by the service 14-1 (productpage) to the instance 20-1 of the service 14-4 (reviews). The traffic information 34 may comprise thousands or even millions of entries 36.

The services 14 may also implement tracing functionality to generate trace information 38. The trace information 38 can comprise, for example, a unique transaction identifier that establishes a relationship between the traces generated by different services 14 during the generation of the same web page. The trace information 38 can also include, for example, the duration of the processing of a service 14 for the particular message, a start time and end time, attributes and characteristics about the particular message being processed, the values of variables at that point in time, and basically any other data available to the service at that instant in time. Any suitable tracing technology may be utilized. In some implementations, the Jaeger tracing technology (www.jaegertracing.io) may be utilized in the service mesh 12.

The trace information 38 includes a plurality of trace records 40-1-40-3, each of which comprises a plurality of entries associated with the same transaction, and each of which identifies a set of the services 14 that were invoked during a same transaction. Some of the entries correspond to traces generated during the transaction. Traces can be nested such that a first trace is initiated, and before the first trace is terminated, a second trace is initiated. Thus, the duration time of the first trace includes the duration time of the second trace. Any number of traces can be initiated by a single service 14 during the same transaction.

As an example, the trace record 40-1 includes a plurality of entries 42-1-42-8. The entry 42-1 contains information that identifies the unique transaction identifier (23245) of the transaction that corresponds to the trace record 40-1, the date of the trace (Jun. 3, 2020), the duration of the longest trace (28.41 milliseconds (ms)), and the start time of the first trace (11:03:15.374).

The entry 42-2 corresponds to a trace generated by a service. The entry 42-2 contains a trace service identifier (TSI) that identifies the service 14-1 (productpage) as the service 14 that initiated the trace. The entry 42-2 identifies a duration of the trace, and may include additional data, such as the start time of the trace, the end time of the trace, values of variables at the time of the trace, and any other suitable or desirable information.

The entry 42-3 corresponds to another trace also generated by the service 14-1 (productpage). The entry 42-3 is indented with respect to the entry 42-3 to visually convey that the entry 42-3 is a nested trace. In other words, the trace that corresponds to the entry 42-2 was initiated first, and not terminated at the time the trace that corresponds to the entry 42-3 was initiated. This nested relationship may be determined in any number of ways, such as, by way of non-limiting example, start time and end time for each entry 42-2-42-8.

The entry 42-4 corresponds to a trace generated by the service 14-2 (details). The entry 42-4 is indented with respect to the entry 42-3 to visually convey that the entry 42-4 is also a nested trace. The entry 42-5 corresponds to another trace generated by the service 14-1 (productpage). The entry 42-5 is indented with respect to the entry 42-2 to visually convey that the entry 42-5 is also a nested trace, but that the trace was initiated after the traces that correspond to the entries 42-3 and 43-4 had completed.

The entry 42-6 corresponds to a trace generated by the service 14-4 (reviews), and in particular, to the instance 20-2. The entry 42-7 is a nested trace that also corresponds to the service 14-4 (reviews), and in particular, to the instance 20-2. The entry 42-8 corresponds to a trace generated by the service 14-5 (ratings). Thus, during the same transaction to generate a single web page, seven traces were generated and stored in the trace information 38.

Figure 2A:
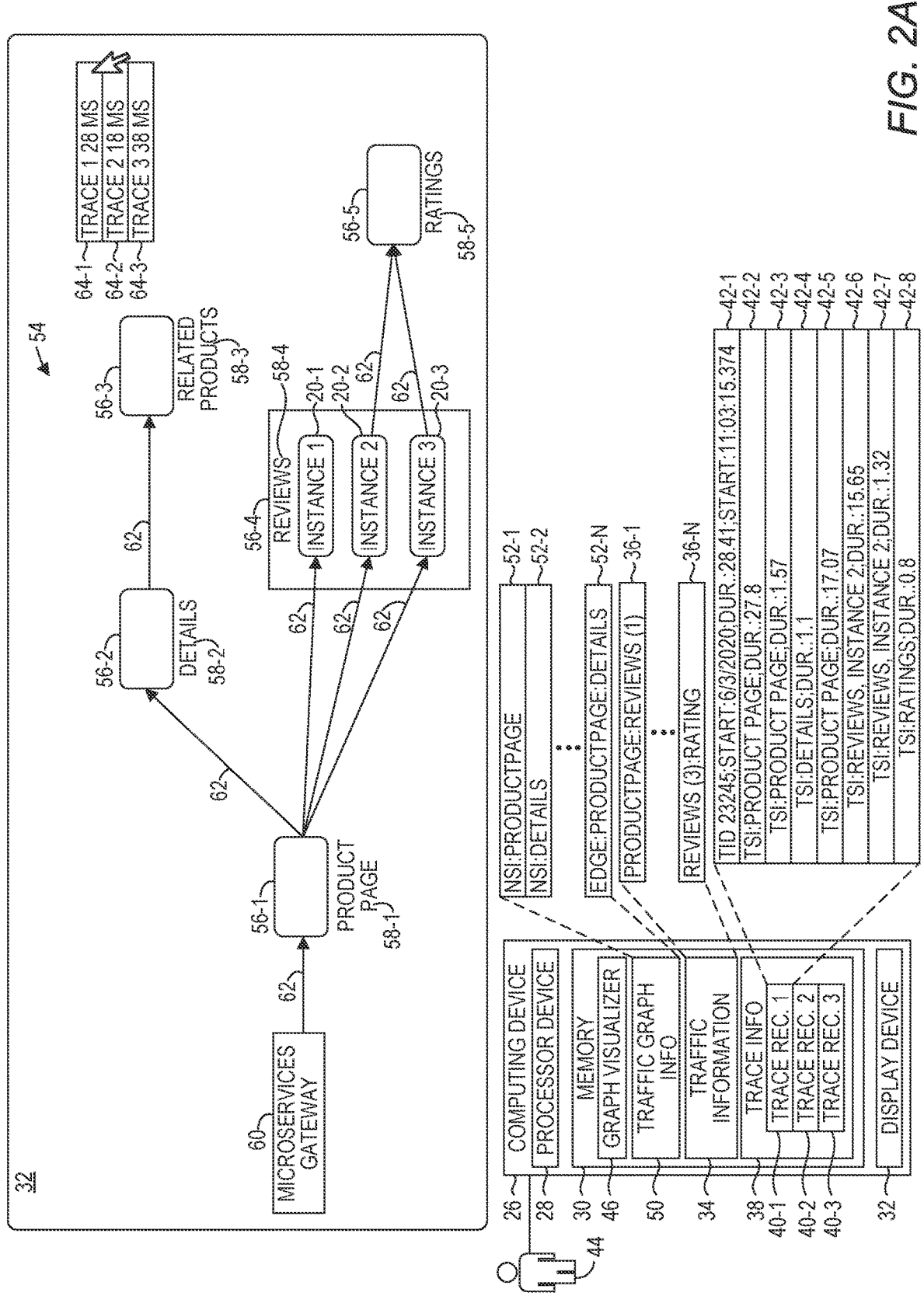
FIGS. 2A-2G are block diagrams illustrating a sequence of visualizations that may be presented on a display device according to some examples.

FIGS. 2A-2G are block diagrams illustrating a sequence of visualizations that may be presented on the display device 32 according to some examples. Referring first to FIG. 2A, an operator 44, interacting with a user interface presented by a graph visualizer 46, requests that a traffic graph visualization be presented on the display device 32. The graph visualizer 46 accesses the traffic information 34 and, based on the traffic information 34, generates traffic graph information 50. The traffic graph information 50 comprises a plurality of entries 52-1-52-N. The entries 52-1-52-N identify nodes that correspond to the services 14-1-14-5. The nodes are identified based on the entries 36. The entries 52-1-52-N also identify edges between the nodes that indicate traffic, e.g., messages, that have been communicated from one service 14 to another service 14. As an example, the entry 52-1 contains a node service identifier (NSI) that identifies a productpage node, which corresponds to the service 14-1. The entry 52-2 contains a node service identifier (NSI) that identifies a details node, which corresponds to the service 14-2. The entry 52-1 identifies an edge between the productpage node and the details node, thereby indicating that at least one message has been communicated by the service 14-1 to the service 14-2.

The graph visualizer 46 uses the traffic graph information 50 to generate a traffic graph visualization 54 which is presented on the display device 32. The traffic graph visualization 54 includes a plurality of nodes 56-1-56-5, each of which corresponds to a service 14-1-14-5, respectively. The traffic graph visualization 54 includes indicia 58-1-58-5 which identifies the particular service 14 that is represented by the node 56. The traffic graph visualization 54 also depicts a gateway node 60 that corresponds to the gateway service 22. The traffic graph visualization 54 includes a plurality of edges 62 that extend between pairs of the nodes 56, and which represent paths of messages that have been communicated from one corresponding service 14 to another corresponding service 14. Thus, the edges 62 are based on the existence of actual message traffic between two services 14. The traffic graph visualization 54 allows the operator 44 to visually and intuitively understand the processing relationship of the services 14 with respect to one another, and the flow of information between the services 14.

It is noted that, because the graph visualizer 46 is a component of the computing device 26, functionality implemented by the graph visualizer 46 may be attributed to the computing device 26 generally. Moreover, in examples where the graph visualizer 46 comprises software instructions that program the processor device 28 to carry out functionality discussed herein, functionality implemented by the graph visualizer 46 may be attributed herein to the processor device 28.

Either by default, or in response to user input from the operator 44, the graph visualizer 46 may access the trace information 38, generate trace controls 64-1-64-3 (generally, trace controls 64), and present the trace controls 64 on the display device 32 concurrently with the traffic graph visualization 54. Each trace control 64-1-64-3 corresponds to a trace record 40-1-40-3, respectively. For purposes of illustration, assume that the operator 44 selects the trace control 64-1.

Figure 2B:
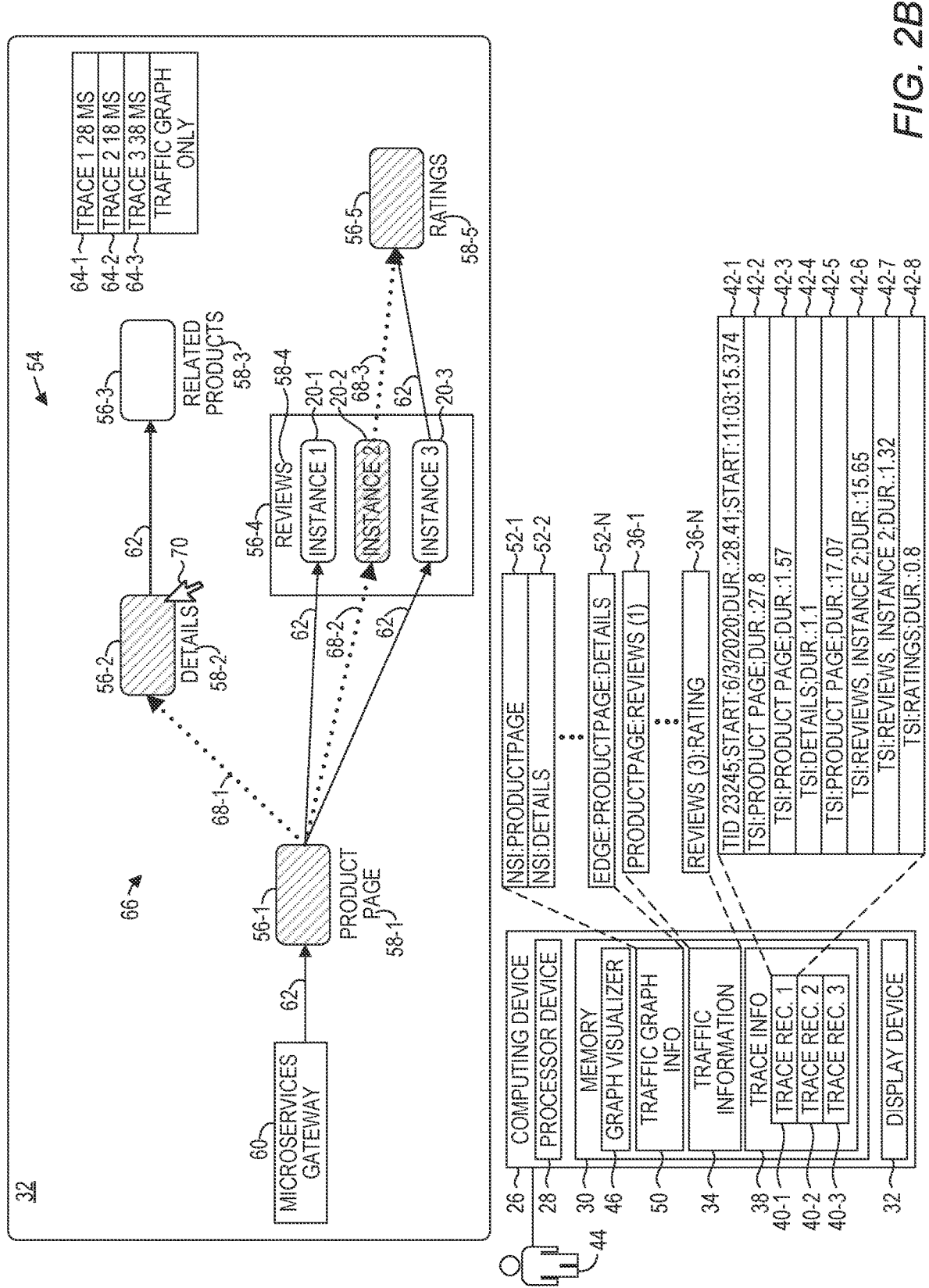

Referring now to FIG. 2B, the graph visualizer 46 receives the user input selecting the trace control 64-1, and accesses the trace record 40-1 which corresponds to the trace control 64-1. The entries 42-2-42-8 identify a set of services 14 that were invoked during the same transaction. In this example, the set of services 14 includes the productpage service 14-1, the details service 14-2, the reviews service 14-4, and the ratings service 14-5. The graph visualizer 46 correlates each of the services 14-1, 14-2, 14-4, and 14-5 with a corresponding node 56. In one implementation, the graph visualizer 46 correlates the services 14 with the nodes 56 by accessing, in each of the entries 42-2-42-8, the trace service identifier (TSI) identified in the respective entry 42-2-42-8, accessing the node service identifier of each of the entries 52, and matching the trace service identifier of each respective service 14 with the node service identifier of the corresponding node 56.

The graph visualizer 46 generates a transaction trace visualization 66 that identifies the nodes 56-1, 56-2, 56-4, and 56-5 that correspond to the services 14-1, 14-2, 14-4, and 14-5, respectively, and presents the transaction trace visualization 66 on the display device 32 concurrently with the traffic graph visualization 54. In this example, the identification of the nodes 56-1, 56-2, 56-4, and 56-5 is via cross-hatching to conform with drawing requirements; however, in practice, any mechanism for visually distinguishing the nodes 56-1, 56-2, 56-4, and 56-5 may be used, such as by making the nodes 56-1, 56-2, 56-4, and 56-5 a different color from, for example, the node 56-3, or by having a thicker perimeter, by having a different font, or via textual indicia.

The transaction trace visualization 66 may also identify which of the edges 62 (e.g., paths) of the traffic graph visualization 54 between the nodes 56-1, 56-2, 56-4 and 56-5, were utilized during the transaction. In this example, some of the edges 62 have been replaced by a different visual indicator, such as dotted edges 68-1-68-3, each of which corresponds to a communication of a message associated with the transaction to a service 14 and/or a receipt of a message associated with the transaction from a service 14. As an example, the edge 68-1 indicates that during the transaction 23245, the sending service 14-1 sent a message to the receiving service 14-2 (sender and receiver denoted via the direction of the arrowhead of the edge 68-1). The edge 68-2 indicates that during the transaction 23245, the sending service 14-1 also sent a message to the receiving service 14-4, which was handled by the instance 20-2. The edge 68-3 indicates that during the transaction 23245, the instance 20-2 of the sending service 14-4 sent a message to the receiving service 14-5. While in this implementation, the edges 68-1-68-3 replaced certain of the edges 62 of the traffic graph visualization 54, in other implementations, the edges 68-1-68-3 may be placed adjacent to or otherwise be visually depicted in addition to the edges 62.

Figure 2C:
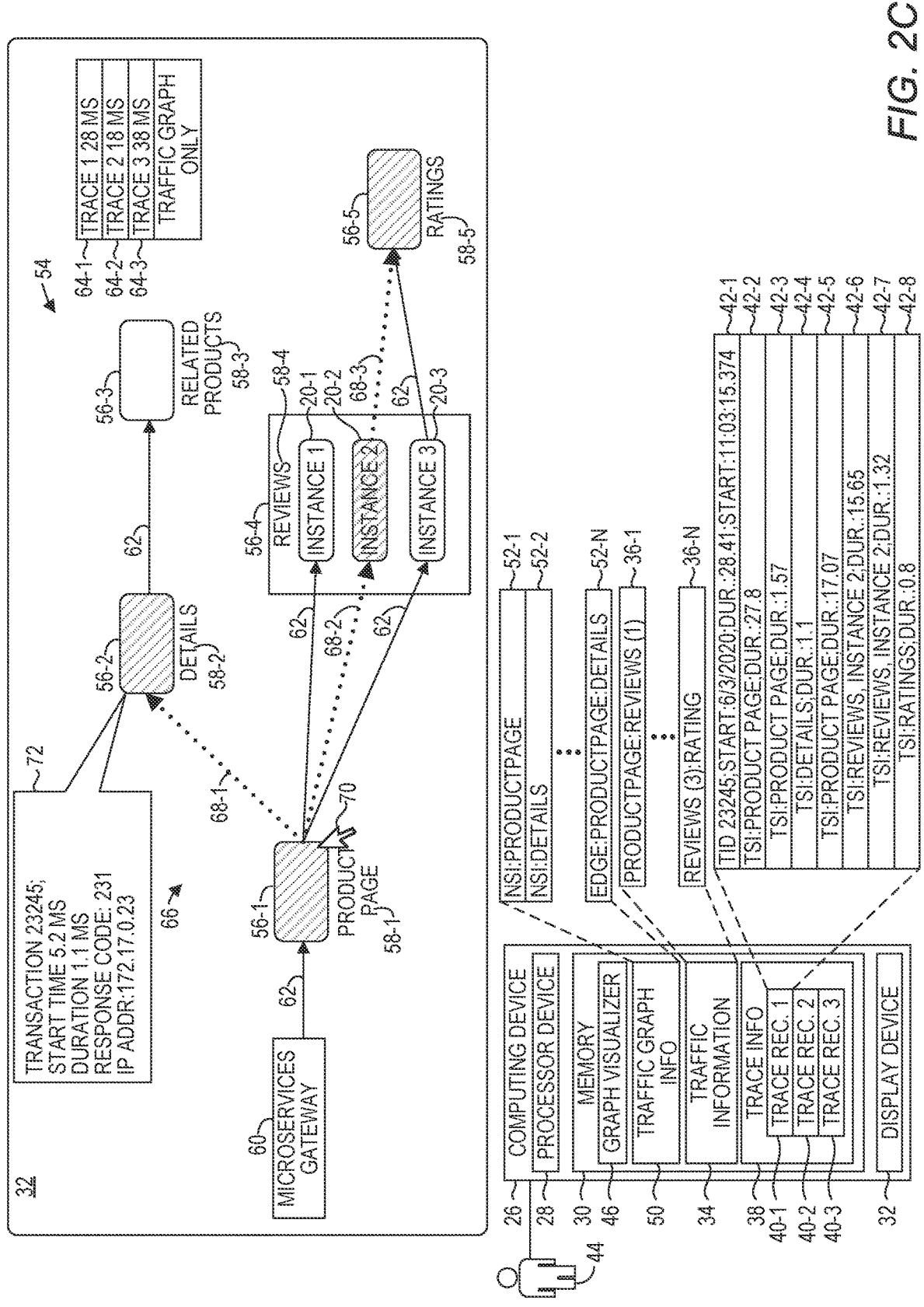

Assume that the operator 44 hovers a cursor 70 over the node 56-2, or otherwise selects the node 56-2. Referring now to FIG. 2C, the graph visualizer 46 receives the user input of the operator 44 that identifies the node 56-2. The graph visualizer 46 determines that the service 14-2 corresponds to the node 56-2. The graph visualizer 46 accesses the trace record 40-1 of the trace information 38 to obtain information that identifies an amount of time (e.g., duration) spent by the service 14-2 servicing the transaction, as well as other data contained in the entry 42-4, including, in this example, the transaction identifier of the transaction, the start time of the trace that corresponds to the entry 42-4, a response code, and an IP address of the service 14-2. The graph visualizer 46 generates a graphic 72, and presents the graphic 72 on the display device 32.

Figure 2D:
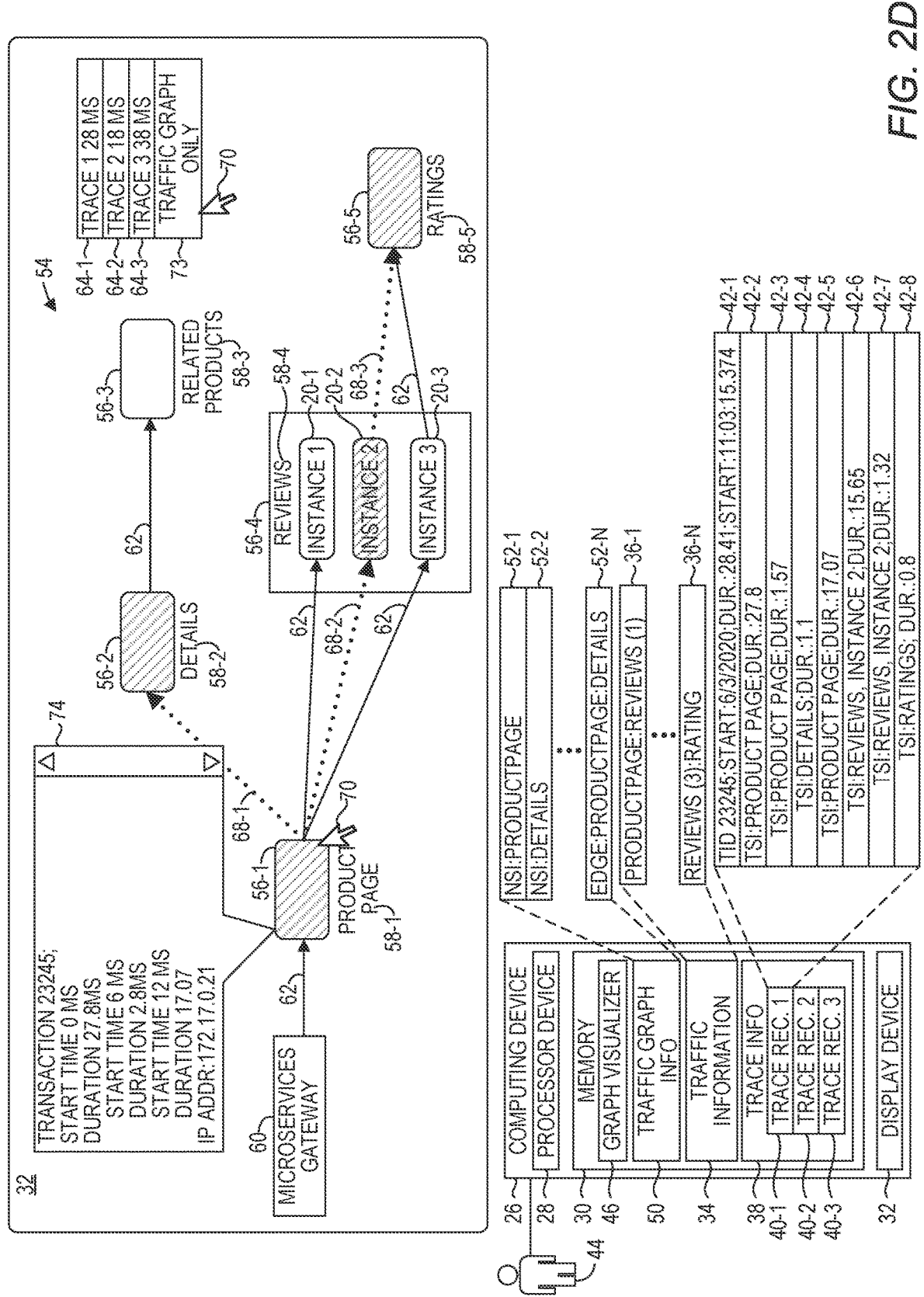

Assume that the operator 44 next hovers the cursor 70 over the node 56-1, or otherwise selects the node 56-1. Referring now to FIG. 2D, the graph visualizer 46 receives the user input of the operator 44 that identifies the node 56-1. The graph visualizer 46 determines that the service 14-1 corresponds to the node 56-1. The graph visualizer 46 accesses the trace record 40-1 of the trace information 38. The graph visualizer 46 determines that the trace entries 42-2, 42-3, and 42-5 each correspond to a trace initiated by the service 14-1. The graph visualizer 46 generates a graphic 74 that identifies relevant information from the trace record 40-1 and the entries 42-2, 42-3, and 42-5, and presents the graphic 74 on the display device 32. In this example, the graphic 74 includes a scroll bar that allows the operator 44 to scroll downwards and be presented with additional information derived from the trace entries 42-2, 42-3, and 42-5. In some implementations, the operator 44 may request that the trace information associated with each of the nodes 56-1, 56-2, 56-4, and 56-4 be presented concurrently on the display device 32.

Figure 2E:
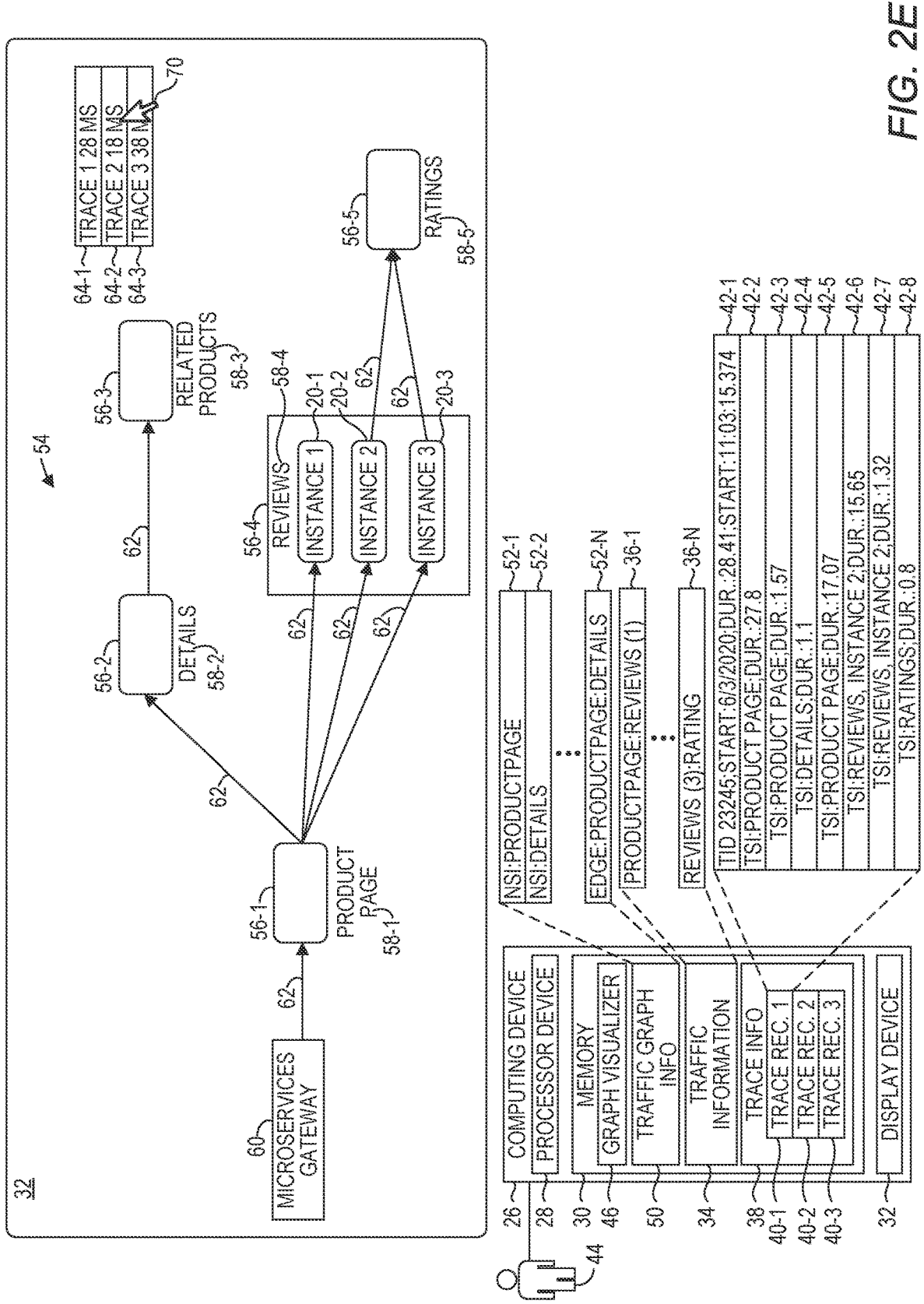
Figure 2F:
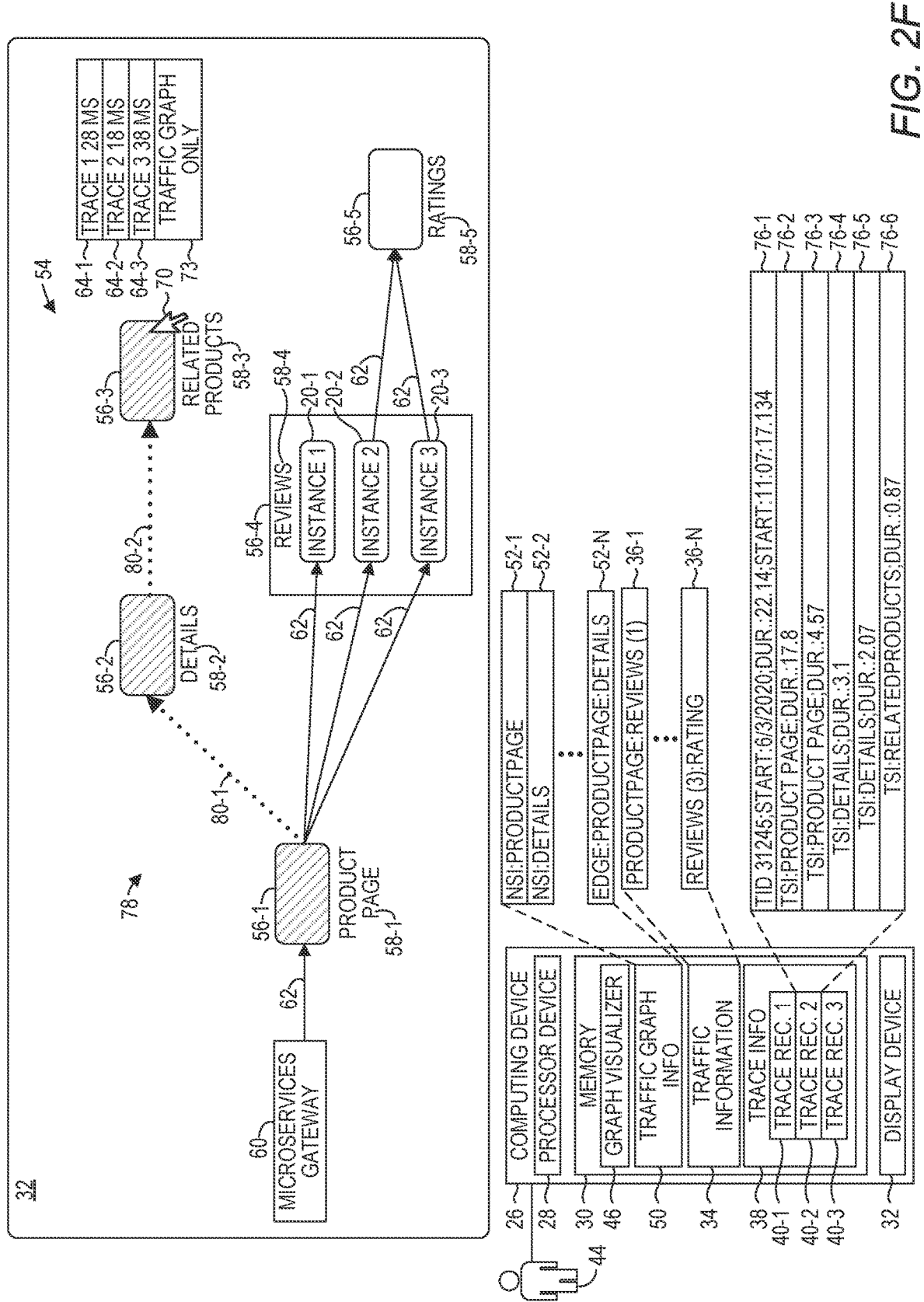

Assume that the operator 44 next selects a traffic graph control 73. Referring now to FIG. 2E, the graph visualizer 46 receives the user input of the operator 44 that identifies the traffic graph control 73, and again presents only the traffic graph visualization 54 on the display device 32. The operator 44 next selects the trace control 64-2 to obtain a transaction trace visualization of the trace of the transaction that corresponds to the trace control 64-2. Referring now to FIG. 2F, the graph visualizer 46 receives the user input selecting the trace control 64-2, and accesses the trace record 40-2 which corresponds to the trace control 64-2. The trace record 40-2 comprises entries 76-1-76-6. The entry 76-1 contains information that identifies the unique transaction identifier (31245) of the transaction that corresponds to the trace record 40-2, the date of the trace (Jun. 3, 2020), the duration of the longest trace (22.14 milliseconds (ms)), and the start time of the first trace (11:07:17.134). The entry 76-2 corresponds to a trace generated the service 14-1; the entry 76-3 corresponds to a trace generated the service 14-1; the entry 76-4 corresponds to a trace generated the service 14-2; the entry 76-5 corresponds to a trace generated the service 14-2; and the entry 76-6 corresponds to a trace generated the service 14-3.

The graph visualizer 46 correlates each of the services 14-1, 14-2, and 14-3 with the corresponding nodes 56-1, 56-2, and 56-3, respectively, as discussed above. The graph visualizer 46 generates a transaction trace visualization 78 that identifies the nodes 56-1, 56-2, and 56-3 that correspond to the services 14-1, 14-2, and 14-3, respectively, and presents the transaction trace visualization 78 on the display device 32 concurrently with the traffic graph visualization 54. The transaction trace visualization 78 identifies edges 80-1 and 80-2 between the nodes 56-1, 56-2, and 56-3, each edge 80-1, 80-2 corresponding to a communication of a message associated with the transaction to a service 14 and/or a receipt of a message associated with the transaction from a service 14.

Figure 2G:
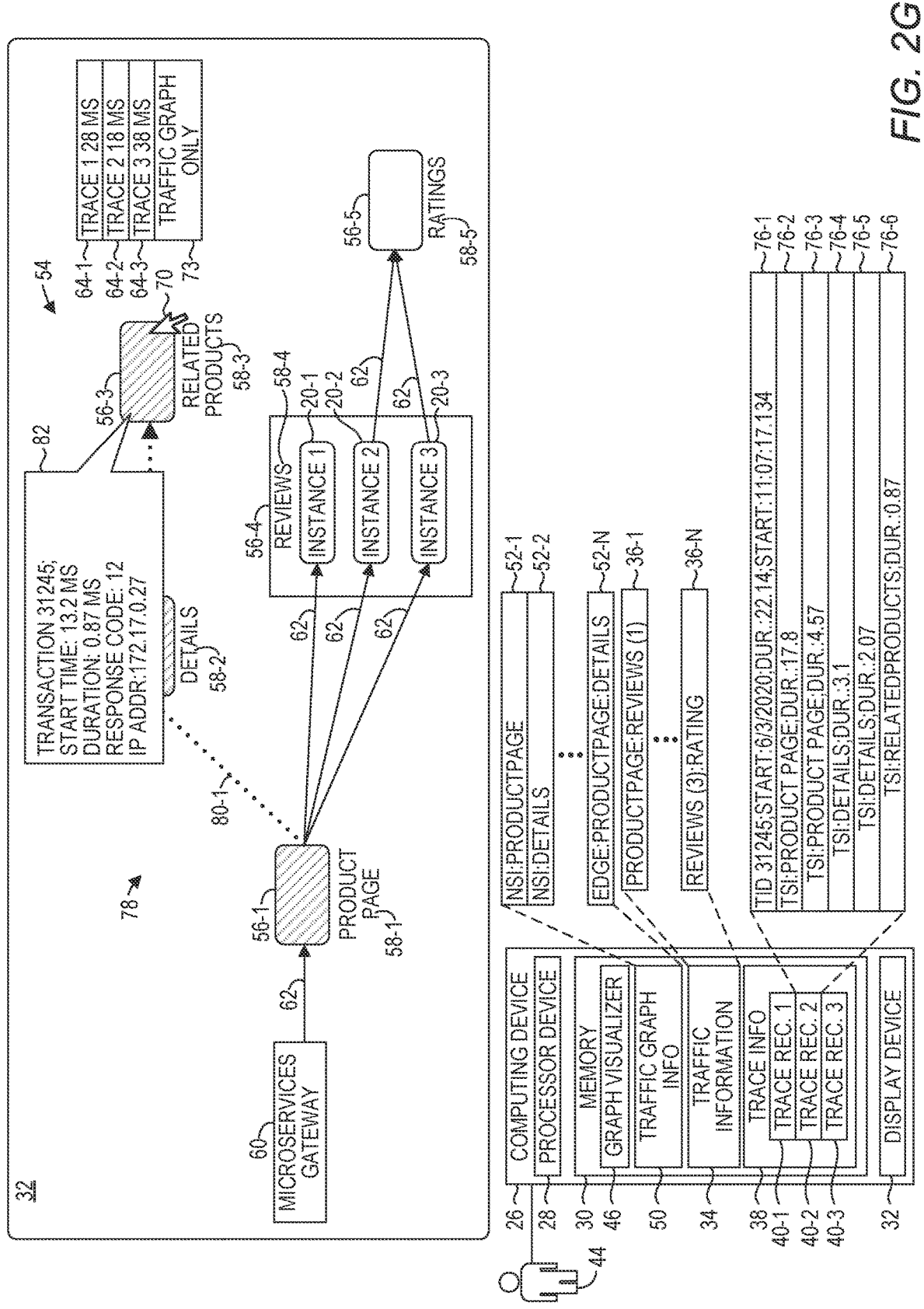

Assume that the operator 44 hovers the cursor 70 over the node 56-3, or otherwise selects the node 56-3. Referring now to FIG. 2G, the graph visualizer 46 receives the user input of the operator 44 that identifies the node 56-3. The graph visualizer 46 determines that the service 14-3 corresponds to the node 56-3. The graph visualizer 46 accesses the trace record 40-2 of the trace information 38 to obtain information that identifies an amount of time (e.g., duration) spent by the service 14-3 servicing the transaction, as well as other data contained in the entries 76-1 and 76-6, including, in this example, the transaction identifier of the transaction, the start time of the trace that corresponds to the entry 76-6, a response code, and an IP address of the service 14-3. The graph visualizer 46 generates a graphic 82, and presents the graphic 82 on the display device 32.

In this manner, the examples disclosed herein provide a highly intuitive mechanism by which the operator 44 can simultaneously view the traffic graph visualization 54 of the service mesh 12, which illustrates the flow of traffic generally of the service mesh 12, and of the transaction trace visualization 78 of a particular transaction performed in the service mesh 12, as well as particular statistics that relate to that transaction.

Figure 3:
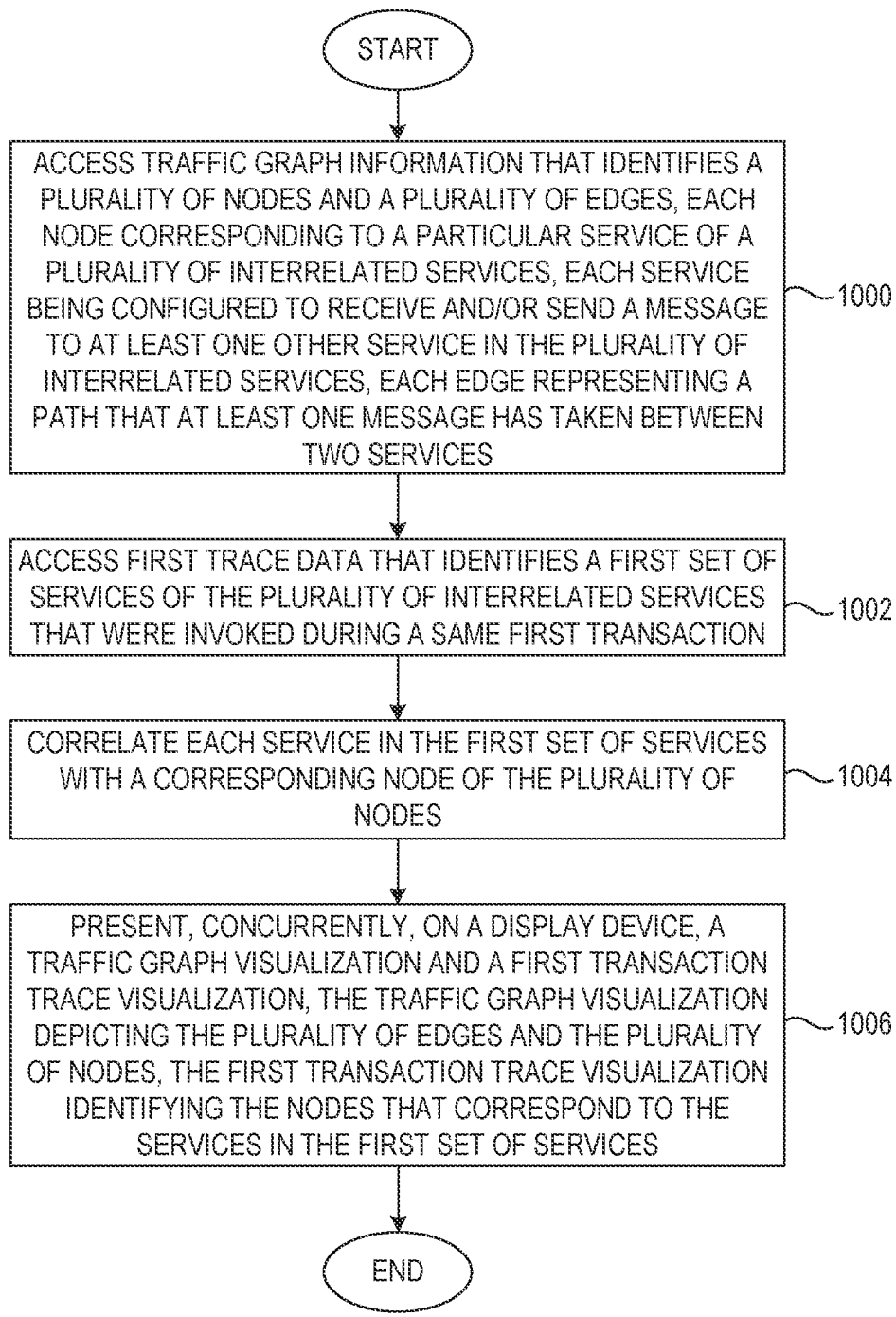
FIG. 3 is a flow chart of a method for incorporation of a trace visualization with a traffic graph visualization in the service mesh, according to one implementation.

FIG. 3 is a flow chart of a method for incorporation of a trace visualization with a traffic graph visualization in the service mesh 12, according to one implementation. FIG. 3 will be discussed in conjunction with FIG. 2B. The graph visualizer 46 accesses the traffic graph information 50 that identifies the plurality of nodes 56 and the plurality of edges 62, each node 56 corresponding to a particular service 14 of the plurality of interrelated services 14, each service 14 being configured to receive and/or send a message to at least one other service 14 in the plurality of interrelated services 14, each edge 62 representing a path that at least one message has taken between two services 14 (FIG. 3, block 1000).

The graph visualizer 46 accesses the trace information 38 that identifies the set of services 14-1, 14-2, 14-4, and 14-5 of the plurality of services 14 that were invoked during the same transaction (FIG. 3, block 1002). The graph visualizer 46 correlates each service 14 in the first set of services 14-1, 14-2, 14-4, and 14-5 with a corresponding node 56 of the plurality of nodes 56 (FIG. 3, block 1004). The graph visualizer 46 presents, concurrently, on the display device 32, the traffic graph visualization 54 and the transaction trace visualization 66, the traffic graph visualization 54 depicting the plurality of edges 62 and the plurality of nodes 56, the transaction trace visualization 66 identifying the nodes 56 that correspond to the services 14 in the first set of services 14-1, 14-2, 14-4, and 14-5 (FIG. 3, block 1006).

Figure 4:
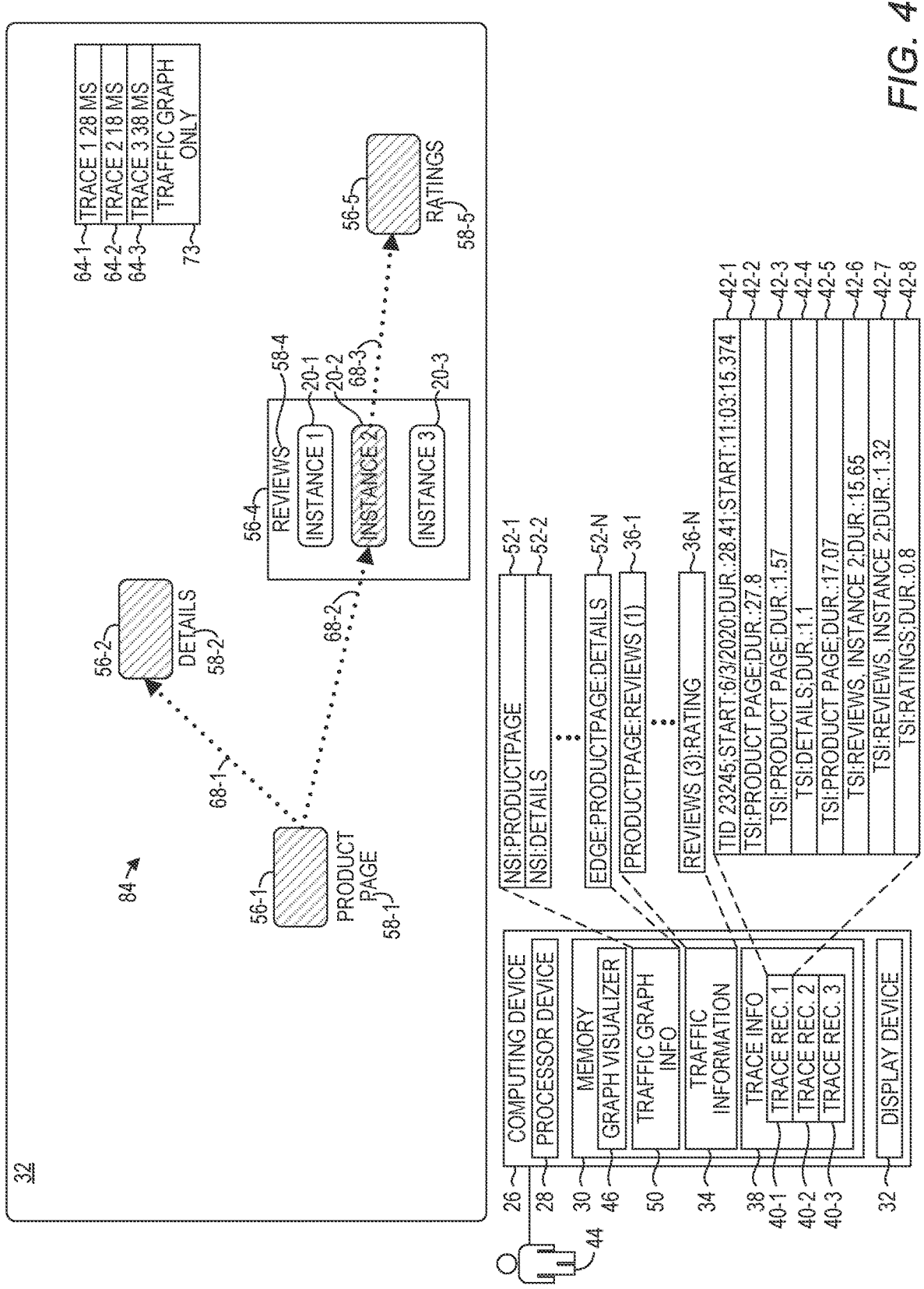
FIG. 4 is a block diagram of a transaction trace visualization according to one implementation.

FIG. 4 is a block diagram of a transaction trace visualization 84 according to one implementation. In this example, the operator 44 has requested only a transaction trace visualization of the trace that corresponds to the trace record 40-1. In response, the graph visualizer 46 generates the transaction trace visualization 84 and presents it on the display device 32 alone, without a traffic graph visualization. If desired, the operator 44 may select any of the nodes 56-1, 56-2, 56-4, or 56-5 to be presented with the detailed trace information associated with the traces initiated by the corresponding services 14-1, 14-2, 14-4, or 14-5, in the same manner as discussed above.

Figure 5:
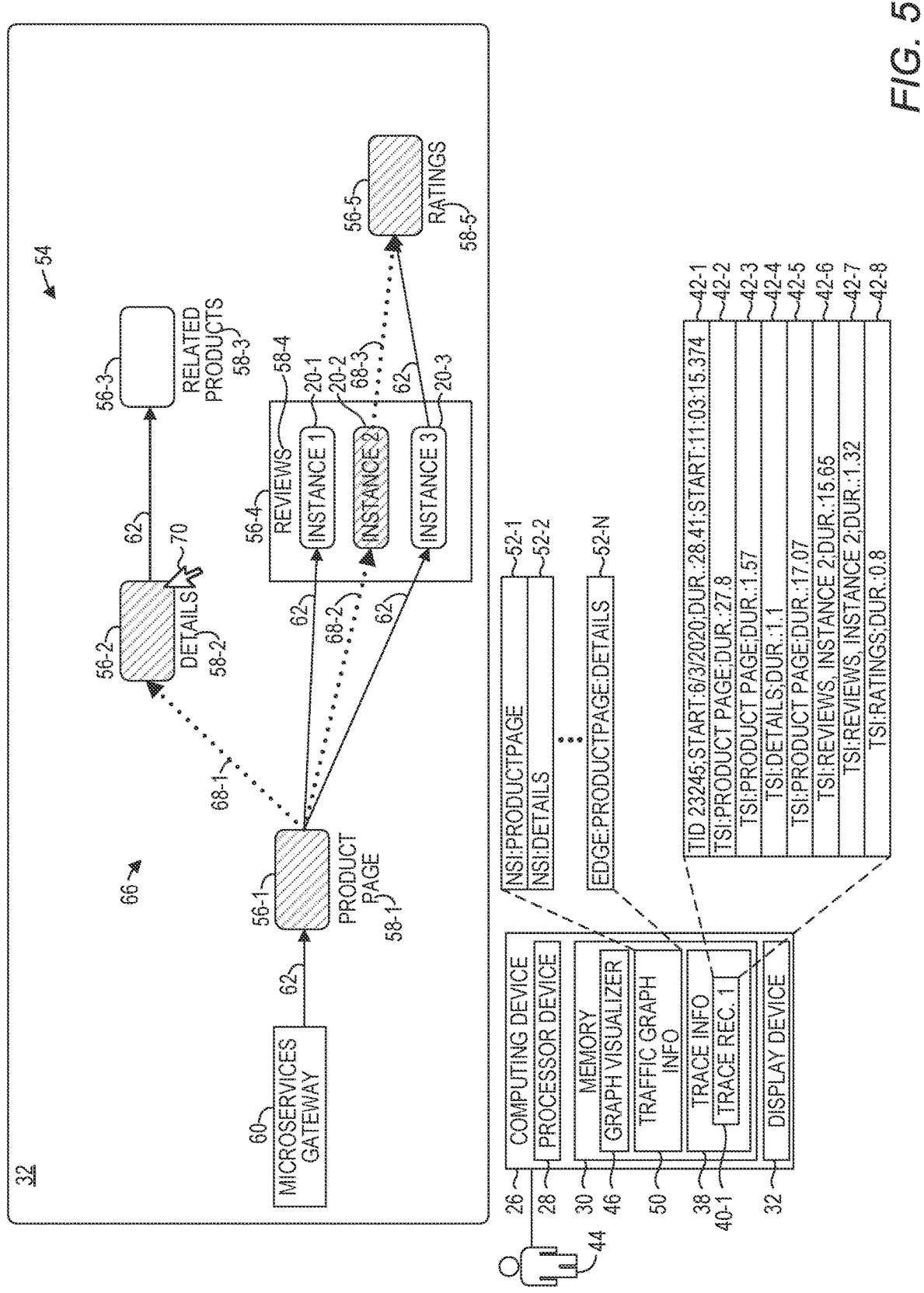
FIG. 5 is a simplified block diagram of FIG. 2B according to one implementation.

FIG. 5 is a simplified block diagram of FIG. 2B according to one implementation. FIG. 5 includes the computing device 26, which in turn includes the memory 30 and the at least one processor device 28 coupled to the memory 30. The processor device 28 is to access the traffic graph information 50 that identifies the plurality of nodes 56 and the plurality of edges 62, each node 56 corresponding to a particular service 14 of the plurality of interrelated services 14, each service 14 being configured to receive and/or send a message to at least one other service 14 in the plurality of interrelated services 14, each edge 62 representing a path that at least one message has taken between two services 14. The processor device 28 is to access the trace information 38 that identifies the set of services 14-1, 14-2, 14-4, and 14-5 of the plurality of interrelated services 14 that were invoked during the same transaction. The processor device 28 is to correlate each service 14 in the first set of services 14-1, 14-2, 14-4, and 14-5 with a corresponding node 56 of the plurality of nodes 56. The processor device 28 is to present, concurrently, on the display device 32, the traffic graph visualization 54 and the first transaction trace visualization 66, the traffic graph visualization 54 depicting the plurality of edges 62 and the plurality of nodes 56, the first transaction trace visualization identifying the nodes 56 that correspond to the services 14 in the first set of services 14.

Figure 6:
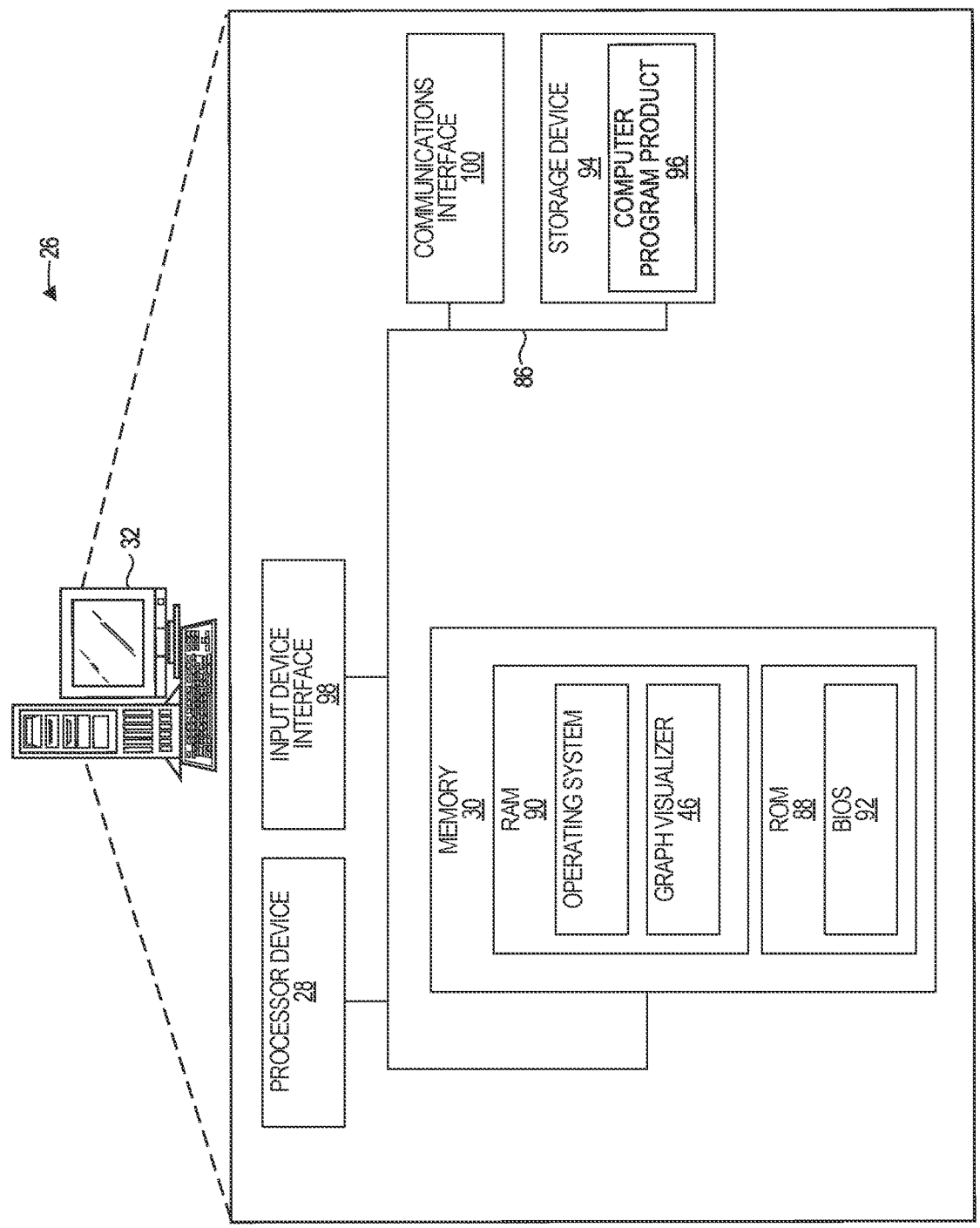
FIG. 6 is a block diagram of a computing device suitable for implementing examples disclosed herein.

FIG. 6 is a block diagram of a computing device suitable for implementing examples disclosed herein. The computing device 26 may comprise any computing or electronic device capable of including firmware, hardware, and/or executing software instructions to implement the functionality described herein, such as a computer server, a desktop computing device, a laptop computing device, or the like. The computing device 26 includes the processor device 28, the system memory 30, and a system bus 86. The system bus 86 provides an interface for system components including, but not limited to, the system memory 30 and the processor device 28. The processor device 28 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The system memory 30 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help to transfer information between elements within the computing device 26. The volatile memory 90 may also include a high-speed RAM, such as static RAM, for caching data.

The computing device 26 may further include or be coupled to a non-transitory computer-readable storage medium such as the storage device 94, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 94 and other drives associated with computer-readable media and computer-usable media may provide non-volatile storage of data, data structures, computer-executable instructions, and the like.

A number of modules can be stored in the storage device 94 and in the volatile memory 90, including an operating system and one or more program modules, such as the graph visualizer 46, which may implement the functionality described herein in whole or in part.

All or a portion of the examples may be implemented as a computer program product 96 stored on a transitory or non-transitory computer-usable or computer-readable storage medium, such as the storage device 94, which includes complex programming instructions, such as complex computer-readable program code, to cause the processor device 28 to carry out the steps described herein. Thus, the computer-readable program code can comprise software instructions for implementing the functionality of the examples described herein when executed on the processor device 28. The processor device 28, in conjunction with the graph visualizer 46 in the volatile memory 90, may serve as a controller, or control system, for the computing device 26 that is to implement the functionality described herein.

The operator 44 may also be able to enter one or more configuration commands through a keyboard, a pointing device such as a mouse (not illustrated), or a touch-sensitive surface such as the display device 32. Such input devices may be connected to the processor device 28 through an input device interface 98 that is coupled to the system bus 86 but can be connected by other interfaces such as a parallel port, an Institute of Electrical and Electronic Engineers (IEEE) 1394 serial port, a Universal Serial Bus (USB) port, an IR interface, and the like. The computing device 26 may also include a communications interface 100, such as a transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   accessing, by at least one processor device, traffic graph information that identifies a plurality of nodes and a plurality of edges, each node corresponding to a particular service of a plurality of interrelated services that compose a service mesh, each service being configured to receive and/or send a message to at least one other service in the plurality of interrelated services, each edge representing a path that at least one message has taken between two services;
   accessing a plurality of trace records, each respective trace record of the plurality of trace records corresponding to a transaction of a plurality of transactions and identifying a first set of services of the plurality of interrelated services that were invoked during the corresponding transaction of the plurality of transactions;
   presenting, concurrently, on a display device, a traffic graph visualization and a plurality of user selectable trace controls, each user selectable trace control corresponding to a different one of the plurality of trace records, the traffic graph visualization depicting the plurality of edges and the plurality of nodes that correspond to the plurality of interrelated services; and
   responsive to a first user input that selects a first user selectable trace control of the plurality of user selectable trace controls, presenting, concurrently, on the display device, the traffic graph visualization, the plurality of user selectable trace controls, and a first transaction trace visualization, the first transaction trace visualization identifying nodes that correspond to services in the first set of services identified in the trace record corresponding to the first user selectable trace control by visually distinguishing nodes depicted in the traffic graph visualization that correspond to the first set of services from those nodes that correspond to services in the plurality of interrelated services that are absent from the first set of services.

2. The method of claim 1 wherein the traffic graph information comprises information about a plurality of messages communicated between the services in the plurality of interrelated services, the information identifying, for at least some of the plurality of messages, a sending service and a receiving service.

3. The method of claim 1 wherein each service of the plurality of interrelated services has a corresponding proxy, and wherein each service receives messages from other services via the corresponding proxy and each service sends messages to the other services via the corresponding proxy.

4. The method of claim 1, wherein, prior to presenting the traffic graph visualization, the plurality of user selectable trace controls, and the first transaction trace visualization, the method comprises:
   receiving the first user input that selects the first user selectable trace control of the plurality of user selectable trace controls.

5. The method of claim 1 further comprising presenting, in association with a node of the plurality of nodes that corresponds to a service in the first set of services, on the display device a duration time that identifies an amount of time spent by the service servicing a corresponding transaction.

6. The method of claim 1 wherein the first transaction trace visualization further identifies edges between the nodes that correspond to the services in the first set of services using a different visual indicator than edges between the nodes that correspond to the services in the plurality of interrelated services that are absent from the first set of services, each edge corresponding to a communication of a message associated with a corresponding transaction to a service in the first set of services and/or a receipt of a message associated with the corresponding transaction from a service in the first set of services.

7. The method of claim 6 wherein at least some of the edges identify a sender service and a receiver service for a corresponding message.

8. The method of claim 1 further comprising correlating each service in the first set of services with a corresponding node of the plurality of nodes by:
   accessing, in the trace record corresponding to the first user selectable trace control that includes, for each respective service in the first set of services, a trace service identifier that identifies the respective service;

accessing the traffic graph information, the traffic graph information including information that identifies, for each respective node, a node service identifier that identifies the service that corresponds to the respective node; and correlating each service in the first set of services with the corresponding node by matching the trace service identifier of each service in the first set of services with the node service identifier of the corresponding node.

9. The method of claim 1 further comprising:

receiving a second user input that identifies a node;

determining a service that corresponds to the node;

accessing the trace record corresponding to the first user selectable trace control to obtain information that identifies an amount of time spent by the service servicing the corresponding transaction; and presenting, concurrently, on the display device, the traffic graph visualization, the first transaction trace visualization, and the information that identifies the amount of time spent by the service servicing the corresponding transaction.

10. A computing device, comprising:

a memory; and at least one processor device coupled to the memory to:
access traffic graph information that identifies a plurality of nodes and a plurality of edges, each node corresponding to a particular service of a plurality of interrelated services, each service being configured to receive and/or send a message to at least one other service in the plurality of interrelated services that compose a service mesh, each edge representing a path that at least one message has taken between two services;

access a plurality of trace records, each respective trace record of the plurality of trace records corresponding to a transaction of a plurality of transactions and identifying a first set of services of the plurality of interrelated services that were invoked during the corresponding transaction of the plurality of transactions;

present, concurrently, on a display device, a traffic graph visualization and a plurality of user selectable trace controls, each user selectable trace control corresponding to a different one of the plurality of trace records, the traffic graph visualization depicting the plurality of edges and the plurality of nodes that correspond to the plurality of interrelated services; and responsive to a first user input that selects a first user selectable trace control of the plurality of user selectable trace controls, present, concurrently, on the display device, the traffic graph visualization, the plurality of user selectable trace controls, and a first transaction trace visualization, the first transaction trace visualization identifying nodes that correspond to services in the first set of services identified in the trace record corresponding to the first user selectable trace control by visually distinguishing nodes depicted in the traffic graph visualization that correspond to the first set of services from those nodes that correspond to services in the plurality of interrelated services that are absent from the first set of services.

11. The computing device of claim 10 wherein, prior to presenting the traffic graph visualization, the plurality of user selectable trace controls, and the first transaction trace visualization, the at least one processor device is to:

receive the first user input that selects the first user selectable trace control of the plurality of user selectable trace controls.

12. The computing device of claim 10 wherein the at least one processor device is further to present, in association with a node of the plurality of nodes that corresponds to a service in the first set of services, on the display device a duration time that identifies an amount of time spent by the service servicing a corresponding transaction.

13. The computing device of claim 10 wherein the at least one processor device is further to correlate each service in the first set of services with a corresponding node of the plurality of nodes, by:

accessing, in the trace record corresponding to the first trace control that includes, for each respective service in the first set of services, a trace service identifier that identifies the respective service;

accessing the traffic graph information, the traffic graph information including information that identifies, for each respective node, a node service identifier that identifies the service that corresponds to the respective node; and correlating each service in the first set of services with the corresponding node by matching the trace service identifier of each service in the first set of services with the node service identifier of the corresponding node.

14. The computing device of claim 10 wherein the at least one processor device is further to:

receive a second user input that identifies a node;

determine a service that corresponds to the node;

access the trace record corresponding to the first user selectable trace control to obtain information that identifies an amount of time spent by the service servicing the corresponding transaction; and present, concurrently, on the display device, the traffic graph visualization, the first transaction trace visualization, and the information that identifies the amount of time spent by the service servicing the corresponding transaction.

15. A non-transitory computer-readable storage medium that includes executable instructions to, upon execution by a processor device:

access traffic graph information that identifies a plurality of nodes and a plurality of edges, each node corresponding to a particular service of a plurality of interrelated services that compose a service mesh, each service being configured to receive and/or send a message to at least one other service in the plurality of interrelated services, each edge representing a path that at least one message has taken between two services;

access a plurality of trace records, each respective trace record of the plurality of trace records corresponding to a transaction of a plurality of transactions and identifying a first set of services of the plurality of interrelated services that were invoked during the corresponding a transaction of the plurality of transaction;

present, concurrently, on a display device, a traffic graph visualization and a plurality of user selectable trace controls, each user selectable trace control corresponding to a different one of the plurality of trace records, the traffic graph visualization depicting the plurality of edges and the plurality of nodes that correspond to the plurality of interrelated services; and responsive to a first user input that selects a first user selectable trace control of the plurality of user selectable trace controls, present, concurrently, on the display device, the traffic graph visualization, the plurality of user selectable trace controls, and a first transaction trace visualization, the first transaction trace visualization identifying nodes that correspond to services in the first set of services identified in the trace record corresponding to the first user selectable trace control by visually distinguishing nodes depicted in the traffic graph visualization that correspond to the first set of services from those nodes that correspond to services in the plurality of interrelated services that are absent from the first set of services.

16. The non-transitory computer-readable storage medium of claim 15 wherein, prior to presenting the traffic graph visualization, the plurality of user selectable trace controls, and the first transaction trace visualization, the instructions, when executed by the processor device:

receive the first user input that selects the first user selectable trace control of the plurality of user selectable trace controls.

17. The non-transitory computer-readable storage medium of claim 15 wherein the instructions further, when executed by the processor device, present, in association with a node of the plurality of nodes that corresponds to a service in the first set of services, on the display device a duration time that identifies an amount of time spent by the service servicing a corresponding transaction.

18. The non-transitory computer-readable storage medium of claim 15 wherein the instructions further, when executed by the processor device, are to correlate each service in the first set of services with a corresponding node of the plurality of nodes by:

accessing, in the trace record corresponding to the first user selectable trace control that includes, for each respective service in the first set of services, a trace service identifier that identifies the respective service;

accessing the traffic graph information, the traffic graph information including information that identifies, for each respective node, a node service identifier that identifies the service that corresponds to the respective node; and correlating each service in the first set of services with the corresponding node by matching the trace service identifier of each service in the first set of services with the node service identifier of the corresponding node.

19. The non-transitory computer-readable storage medium of claim 15 wherein the instructions further, when executed by the processor device:

receive a second user input that identifies a node;

determine a service that corresponds to the node;

access the trace record corresponding to the first user selectable trace control to obtain information that identifies an amount of time spent by the service servicing the corresponding transaction; and present, concurrently, on the display device, the traffic graph visualization, the first transaction trace visualization, and the information that identifies the amount of time spent by the service servicing the corresponding transaction.

* * * * *